United States Patent
Chopra et al.

(10) Patent No.: US 8,778,070 B1
(45) Date of Patent: Jul. 15, 2014

(54) INK COMPOSITION AND METHOD OF JETTING INK

(71) Applicant: Xerox Corporation, Norwalk, CT (US)

(72) Inventors: Naveen Chopra, Oakville (CA); Adela Goredema, Mississauga (CA); Kentaro Morimitsu, Mississauga (CA); Barkev Keoshkerian, Thornhill (CA); Jennifer L. Belelie, Oakville (CA); Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/765,827

(22) Filed: Feb. 13, 2013

(51) Int. Cl.
*C09D 11/02* (2014.01)

(52) U.S. Cl.
USPC .................. 106/31.29; 106/31.61

(58) Field of Classification Search
CPC ........................................ C09D 11/34
USPC .......................... 106/31.29, 31.61
See application file for complete search history.

(56) References Cited

U.S. PATENT DOCUMENTS

| | | | |
|---|---|---|---|
| 2,937,203 A | | 5/1960 | Fuller |
| 4,028,093 A | | 6/1977 | Teach |
| 4,889,560 A | * | 12/1989 | Jaeger et al. ............... 106/31.29 |
| 6,132,665 A | * | 10/2000 | Bui et al. .................. 264/308 |
| 2010/0288162 A1 | * | 11/2010 | Goredema et al. ......... 106/31.86 |
| 2010/0292467 A1 | * | 11/2010 | Goredema et al. ............ 544/109 |
| 2012/0272864 A1 | * | 11/2012 | Morimitsu et al. ......... 106/31.61 |
| 2012/0274699 A1 | | 11/2012 | Belelie et al. |
| 2012/0274713 A1 | * | 11/2012 | Odell et al. .................... 347/99 |

FOREIGN PATENT DOCUMENTS

| | | |
|---|---|---|
| JP | 57040408 A | 3/1982 |
| JP | 58144114 U | 9/1983 |
| JP | 11071335 A | 3/1999 |

OTHER PUBLICATIONS

Iftime et al., "Fast Crystallizing Crystalline-amorphous Ink Compositions and Methods for Making the Same", U.S. Appl. No. 13/457,157, filed Apr. 26, 2012.
Iftime et al., "Time Resolved Optical Microscopy ("trom") Process for Measuring the Rate of Crystallization of Solid Inks", U.S. Appl. No. 13/456,847, filed Apr. 26, 2012.
Author Unknown, "Hercules® Amine D and Amine D Acetate 50S", Hercules, Technical Information, Bulletin: R-132, Nov. 18, 1997, pp. 1-6.
Author Unknown, Dehydroabietylamine, Chemical Book, retrieved from http://www.chemicalbook.com/ChemicalProductProperty_EN_CB1692875.htm, on Dec. 5, 2012, pp. 1-3.
Kentaro Morimitsu et al., "Ink Composition and Method of Jetting Ink", U.S. Appl. No. 13/848,365, filed Mar. 21, 2013.
Author Unknown, Primene™ JM-T, 1 page, http://www.dow.com/products/product_print.page?display-mode=print&product=1120468, accessed Oct. 20, 2011.
Author Unknown, Primene™ JM-T Amine, Rohm and Haas, Organic Specialties, Oct. 2006, pp. 1-2.

(Continued)

*Primary Examiner* — Veronica F Faison
(74) *Attorney, Agent, or Firm* — MH2 Technology Law Group LLP (57) ABSTRACT

A solid ink composition includes a crystalline component; an amorphous amide component; and a colorant. The crystalline component includes a mono-amide compound with an aromatic ring core.

18 Claims, 2 Drawing Sheets

(56) References Cited

OTHER PUBLICATIONS

Author Unknown, Primene™ 81-R, Rohm and Haas, Material Safety Data Sheet, Jul. 30, 2010, pp. 1-4, http://www.dow.com/products/product_print.page?display-mode=print&product=112054, accessed Oct. 20, 2011.

Author Unknown, Primene™ 81-R Amine, Rohm and Haas, Organic Specialties, Oct. 2006, pp. 1-2.

Author Unknown, Primene™ 81-R, 1 page, http://www.dow.com/products/product_print_page?display-mode=print&product=1120547, accessed Oct. 20, 2011.

Author Unknown, Rosin Amine, PDM, Material Safety Data Sheet, Jan. 2011, pp. 1-3.

* cited by examiner

INK COMPOSITION AND METHOD OF JETTING INK

DETAILED DESCRIPTION

1. Field of the Disclosure

The present disclosure is directed to a solid ink composition, and more particularly to a phase change ink composition comprising amide compounds in both a crystalline component and an amorphous component of the ink.

2. Background

In the field of phase-change inks, crystalline-amorphous inks have been known to provide improved robustness over wax based conventional solid inks on coated substrates with respect to scratch, fold and fold offset. Many amorphous and crystalline materials have been developed for use in crystalline-amorphous inks.

For crystalline-amorphous inks, the crystalline material can impart a hardness and, in some cases, a rapid phase change that allows them to be used for DTP (direct-to-paper) print architectures, although the inks can be used for other applications as well. The amorphous material (typically a viscous, tacky material) aids in adhesion to the substrate and plasticizes the crystalline component to prevent embrittlement and cracking of the printed image.

It has often been the case that the crystalline and amorphous materials are exclusively comprised of esters. A prior formulation has employed a bis-urethane crystalline material. However, urethanes can lack the desired thermal stability, and can undergo deblocking and/or decomposition to insoluble ureas. In addition, esters can be prone to hydrolysis.

A known crystalline component is DST (distearyl terephthalate), prepared from stearyl alcohol and terephthalic acid. However, DST suffers from compromised scratch resistance.

A known amorphous component is a derivative of L-tartaric acid/cyclohexanol/t-butyl cyclohexanol (TBCT), which is considered to contribute to the acceptable robust images. However, TBCT can suffer from several disadvantages, such as thermal stability during synthesis and variations in product distributions, both of which pose challenges for scale-up synthesis.

In the past, ink compositions have generally employed different classes of compounds for the crystalline and the amorphous components. It would be desirable to discover a combination of crystalline and amorphous components that both employ the same functional group. It would also be desirable to discover new combinations of crystalline and amorphous materials that can be used to formulate fast-crystallizing inks.

Thus, there remains a need for an increased variety of novel crystalline and amorphous materials with improved performance in phase-change inks.

SUMMARY

An embodiment of the present disclosure is directed to a solid ink composition. The composition comprises a crystalline component comprising a mono-amide compound with an aromatic ring core; an amorphous amide component; and a colorant.

Another embodiment of the present disclosure is directed to a method. The method comprises providing an ink jet printing device comprising a solid ink composition, the solid ink composition comprising: (a) a crystalline component comprising a mono-amide compound with an aromatic ring core, (b) an amorphous amide component and (c) a colorant. The solid ink composition is heated to a temperature above the melting point of the composition to liquefy the ink composition. The liquefied ink composition is jetted from the ink jet printing device onto a substrate to form an image.

Yet another embodiment of the present disclosure is directed to a solid ink composition. The solid ink composition comprises a crystalline component comprising a mono-amide compound with an aromatic ring core; an amorphous amide component; and a colorant. The crystalline component has a viscosity of less than 12 cps at a temperature of about 140° C.; the amorphous amide component has a viscosity greater than that of the crystalline component and less than 100 cps at a temperature of about 140° C.; and both the crystalline component and the amorphous amide component have a viscosity of greater than $1\times10^{5.5}$ cps at about 25° C.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serves to explain the principles of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to a solid ink composition. The ink composition includes (a) a crystalline component comprising a crystalline mono-amide compound with an aromatic ring core, (b) an amorphous amide component and (c) a colorant.

Crystalline Component

Any crystalline mono-amide compound with an aromatic ring core can be employed that is suitable for use as the crystalline component of a phase change ink. For example, mono-amide compounds with an aromatic ring core chosen from, for example, a benzene group or a naphthalene group, can be used. In an embodiment, the crystalline mono-amide compound is a product of a reaction of benzoic acid and a primary or secondary amine.

The amide group of the crystalline mono-amide component can include at least one $C_1$ to $C_{40}$ substituent group bonded to either a carbonyl group or a nitrogen atom of the amide. The substituent group can be a substituted or unsubstituted, linear, branched or cyclic, saturated or unsaturated, aliphatic or aromatic group that will result in a crystalline compound that provides the desired ink properties, such as a liquid phase state with suitable viscosity at jetting temperatures and solid phase state at about room temperature (e.g., about 25° C.).

One exemplary crystalline mono-amide compound can be a compound of formula 1:

where $R^1$, $R^2$, $R^a$, $R^b$, $R^c$, $R^d$, and $R^e$ are independently selected from the group consisting of a hydrogen atom and $C_1$ to $C_{40}$ aliphatic or $C_1$ to $C_{40}$ aromatic substituents, wherein at least one of $R^1$ and $R^2$ is not a hydrogen atom. In an embodiment, $R^1$, $R^2$, $R^a$, $R^b$, $R^c$, $R^d$, and $R^e$ are independently selected from the group consisting of a hydrogen atom or linear, branched or cyclic $C_1$ to $C_{40}$ alkyl, alkenyl, aryl, alkaryl, arylakyl groups or any $C_1$ to $C_{40}$ alkyl, alkenyl, aryl, alkaryl or arylalkyl groups containing one or more hetero atoms. For example, $R^1$, $R^a$, $R^b$, $R^c$, $R^d$, and $R^e$ can be hydrogen atoms and $R^2$ can be chosen from an alkylphenyl group or a $C_8$ to $C_{30}$ hydrocarbyl group.

Substituents with carbon chains longer than 22 carbon atoms may form a wax-based crystalline component. In some cases it may be desirable to employ a non-wax-based crystalline component, in which case the groups substituted on the mono-amide crystalline component may have chain lengths of 22 carbon atoms or less. For example, the $R^1$ and $R^2$ substituents discussed above can be selected from linear, branched or cyclic, substituted or unsubstituted, aliphatic or aromatic $C_2$ to $C_{18}$ groups, such as $C_2$ to $C_{18}$ alkyl, alkenyl, aryl, alkaryl, arylakyl groups optionally containing one or more heteroatoms (e.g., oxygen, nitrogen or halogen, such as chlorine or bromine).

The crystalline component in the ink formulation drives the phase change through rapid crystallization as the ink cools. The crystalline component also sets up the structure of the final ink film and creates a hard ink by reducing the tackiness of the amorphous component. The crystalline components can exhibit relatively low viscosity, such as a viscosity of less than 12 cps at a temperature of about 140° C., such as, for example, $\leq 10^1$ centipoise (cps), or from about 0.5 to about 10 cps, or from about 1 to about 10 cps, at about 140° C. The crystalline components can exhibit relatively high viscosity, such as, for example greater than $10^{5.5}$ cps at room temperature, such as greater than about $10^6$ cps or about $10^{6.5}$ cps, at about room temperature. Viscosity was measured using a controlled-strain rheometer from TA Instruments (Rheometrics RFS-3). The method used was temperature sweep from about 140° C. to about 90° C. at 1 Hz sweep rate with measurements taken every 5 degrees. Depending on the resin tested, the temperature sweep end temperature was governed by the viscosity. When the transition point was passed and the viscosity sharply increased, the temperature sweep test experiment was ended.

Because the crystalline components generally dictate the phase change of the ink, rapid crystallization can provide immediate print processing (e.g., spreading or duplex printing) and reduce or prevent excessive show through on uncoated substrates. Desirable crystalline components can show relatively sharp crystallization and melting peaks, as determined by, for example, differential scanning calorimetry (DSC) (e.g., 10° C./min from −50 to 200 to −50° C.). In an embodiment, the change in temperature between the crystallization and melting peaks is relatively small, such as, for example, less than about 55° C. or about 60° C. In an embodiment, the melting point can be below the upper limit of the jetting temperature. For example, the melting point can be below about 150° C., such as from about 100° C. to about 145° C., such as about 140° C. A suitable melting point can reduce or prevent blocking and print transfer and may vary depending on standing temperatures that occur in the printing apparatus. For example, the melting point can be above 65° C., such as above 66° C. or 67° C., to reduce or prevent blocking and print transfer upon standing at temperatures up to 65° C.

Amorphous Component

The amorphous amide component is chosen from polycyclic amides, such as polycyclic mono-amides, polycyclic diamides or mixtures thereof. Any polycyclic amides that are suitable as the amorphous amide component for solid ink compositions can be employed. Examples of suitable polycyclic amide compounds include those with an abietyl moiety, such as compounds of formula 2:

where R' is selected from the group consisting of a hydrogen atom or —NHC=$OR^4$, and $R^3$ and $R^4$ are independently selected from the group consisting of $C_1$ to $C_{40}$ aliphatic or $C_1$ to $C_{40}$ aromatic substituents, such as $C_1$ to $C_{22}$ or $C_2$ to $C_{18}$ aliphatic or aromatic groups. In an embodiment, R' is hydrogen and $R^3$ is a $C_1$ to $C_{12}$ alkyl.

In an embodiment, one or more of the rings of the compounds of formula 2 can be unsaturated, such as shown, for example, in formula 3, where R' and $R^3$ are defined the same as described above for formula 2:

The amorphous amide component of the ink composition can provide tackiness and/or impart robustness to the printed ink. Suitable amorphous amide component materials can show no crystallization, relatively low viscosity (e.g., $<10^2$ centipoise (cps), or from about 1 to about 100 cps, or from about 5 to about 95 cps) near the jetting temperature (e.g., $\leq 140°$ C., or from about 100° C. to about 140° C., or from about 105° C. to about 140° C.) but very high viscosity (e.g., greater than about $10^{5.5}$ cps, or greater than about $10^6$ or about $10^{6.5}$ cps) at about room temperature. The amorphous amide component generally has a viscosity greater than that of the crystalline component.

Crystalline and Amorphous Blend

As discussed above, the crystalline and amorphous amide components can each impart specific properties to the solid inks, and the blend of the components can provide inks that exhibit a desired robustness on uncoated and coated substrates. In an embodiment, an ink jet solid ink composition comprises a blend of (1) crystalline and (2) amorphous amide components in a weight ratio that provides the desired ink properties. Examples of suitable weight ratios of crystalline to amorphous materials range from about 60:40 to about 95:5, respectively, such as about 65:35 to about 95:5, or from about 70:30 to about 90:10. In an embodiment, the weight ratio is about 70:30 for the crystalline and amorphous amide components, respectively. In another embodiment, the weight ratio is about 80:20 for the crystalline and amorphous amide components, respectively.

In an embodiment, some or all of the crystalline amide and/or amorphous amide components are bio-renewable. For example, inks of the present disclosure can comprise a bio-renewable content of at least 20% by weight if desired. Some of the inks of this disclosure can potentially have bio-renewable content of up to 66%, or more. Bio-renewable resources are seen as having certain advantages, such as providing sustainable resources and/or potentially being good for the environment.

Ink compositions of the present disclosure can exhibit a range of crystallization rates, depending on the specific composition employed. For example, total time of crystallization can ranging from 3 second or more, such as about 4 seconds to about 10 or 12 seconds, or from about 5 seconds to about 9 seconds, as measured by Time-Resolved Optical Microscopy ("TROM"). The TROM process is described in detail below, as well as in U.S. patent application Ser. No. 13/456,847, filed Apr. 26, 2011 in the name of Gabriel Iftime et al., and entitled Time Resolved Optical Microscopy ("TROM) Process for Measuring the Rate of Crystallization of Solid Inks, the disclosure of which is incorporated herein by reference in its entirety.

Slower crystallizing inks can be employed for use in printers designed for the office market, while faster inks may be suitable for higher production printers. Having both fast and slow crystallizing ink compositions widens the scope of the printing process and can enable 'tailor-made' performance for either office or production space.

In an embodiment, the colorant employed in the inks of the present disclosure is chosen from a dye, a pigment or mixtures thereof. Any dye or pigment may be chosen provided that it is capable of being dispersed or dissolved in the ink carrier and is compatible with the other ink components.

The phase change carrier compositions of the present disclosure can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby entirely incorporated by reference herein, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

In an embodiment, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

Pigments are also suitable colorants for the phase change inks of the present disclosure. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue $K6902_7$, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470

(BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Pigment dispersions in the ink base may be stabilized by synergists and dispersants. Any suitable synergists and/or dispersants can be employed. Suitable synergists and dispersants are well known in the art. Examples of suitable dispersants include polyethyleneimine and SOLSPERSE®, available from Lubrizol Corporation. An example of a suitable synergist is SUNFLO SFD-B124, available from Sun Chemicals.

The colorant may be present in the phase change ink in any desired or effective amount to obtain the desired color or hue such as, for example, from about 0.1 percent by weight of the ink to about 50 percent by weight of the ink, or from about 0.2 percent by weight of the ink to about 20 percent by weight of the ink, or about 0.5 percent by weight of the ink to about 10 percent by weight of the ink.

The ink compositions can be prepared by any desired or suitable method. For example, each of the components of the ink carrier can be mixed together, followed by heating the mixture to at least its melting point, such as, for example from about 60° C. to about 150° C., about 80° C. to about 145° C., or about 85° C. to about 140° C. The colorant may be added before or after the crystalline and amorphous ingredients have been heated.

When pigments are the selected colorants, the molten mixture may be subjected to grinding in an attritor or media mill apparatus to effect dispersion of the pigment in the ink carrier. The heated mixture can then be stirred for about 5 seconds to about 30 minutes or more, for example, to obtain a substantially homogeneous, uniform melt, followed by cooling the ink to ambient temperature (typically from about 20° C. to about 25° C.).

The resulting inks are solid at ambient temperature. The inks can be employed in an apparatus for direct printing ink jet processes or in indirect (offset) printing ink jet applications.

The present disclosure is also directed to a printing method. The method comprises providing an ink jet printing device comprising a solid ink composition. As described herein above, the solid ink composition comprises (a) a crystalline component comprising a mono-amide compound with an aromatic ring core, (b) an amorphous amide component and (c) a colorant. The solid ink composition is heated to a temperature above the melting point of the composition to liquefy the ink composition. The liquefied ink composition is jetted from the ink jet printing device onto a substrate to form an image.

In an embodiment, the melted ink can first be jetted onto an intermediate transfer member. The ink can then be transferred from the intermediate transfer member to a final recording substrate. Examples of suitable offset or indirect printing processes are disclosed in, for example, U.S. Pat. No. 5,389,958, the disclosure of which is totally incorporated herein by reference.

In an embodiment, the printing apparatus employs a piezoelectric printing process wherein droplets of the ink are caused to be ejected in an imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks, as disclosed herein, can also be used in printing processes other than hot melt ink jet printing processes.

Any suitable substrate or recording sheet can be employed in the printing processes of the present disclosure. Example substrates include plain papers such as XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX® Digital Color Elite Gloss, Sappi Warren Papers LUSTROGLOSS, specialty papers such as XEROX® DURAPAPER, and the like, transparency materials, fabrics, textile products, plastics, polymeric films, inorganic recording mediums such as metals and wood, and the like.

EXAMPLES

In the examples below, benzamide derivatives were used as the crystalline compounds. Two benzamide derivatives were prepared: N-phenylethyl benzamide and N-stearyl benzamide were prepared by the reaction of benzoic acid with phenylethylamine and stearylamine, respectively.

An Amine D-based mono-amide, the syntheses of which is described below, was used as the amorphous compound. The Amine D used in the examples was a terpenoid compound obtained from Eastman Chemicals of Kingsport, Tenn. Amine D, sometimes referred to as "rosin amine," can also be obtained from PDM, Inc. or Hercules, Inc., both of Wilmington, Del.

Amine D can be derived from dehydroabeitic acid and is the backbone material of the amorphous component in these examples. These materials are generally well-suited for amorphous materials owing to their polycyclic nature, and are more sustainable since they are derived from pine, which is a renewable resource. Amine D was reacted with hexanoic acid to make the mono-amide described below.

Synthesis of Crystalline Benzamides benzoic acid

-continued benzamide

Example 1

N-phenylethylamine, R=$C_6H_5CH_2CH_2$

To a 3 neck 500 mL round bottomed flask equipped with a dean stark trap and condenser, thermocouple and argon inlet was added benzoic acid (108.41 grams, 887.74 mmoles, available from Sigma Aldrich) and phenylethylamine (107.58 grams, 887.74 mmoles, available from Sigma Aldrich). The mixture was slowly heated under argon to about 160° C. during which reagents melted/dissolved. Temperature was raised to about 180° C. The reaction mixture was stirred at about 180° C. overnight (~20 hours) during which 14 ml of water was collected in the dean stark trap. Vacuum (1-2 mm-Hg) was applied for ~10 minutes. The resulting product was cooled under argon to ~140° C. and discharged in an aluminum tray, cooled to room temperature to give 190.5 grams (95% yield) product as an off white crystalline solid. $^1$H NMR indicated that the desired product was formed. Physical properties of this compound are shown in Table 1.

Example 2

N-stearylamine R=$C_{18}H_{37}$

To a 3 neck 1 L round bottomed flask equipped with a dean stark trap and condenser, thermocouple and argon inlet was added benzoic acid (65.37 grams, 535.3 mmoles, available from Sigma Aldrich) and octadecylamine (144.27 grams, 535.3 mmoles, available from Sigma Aldrich). The mixture was slowly heated under argon to about 160° C. during which reagents melted/dissolved. The temperature was raised to about 180° C. The reaction mixture was stirred at about 180° C. overnight (~20 hours) during which 6 ml of water was collected in the dean stark trap. Vacuum (1-2 mm-Hg) was applied for ~10 minutes. The resulting product was cooled under argon to ~140° C. and discharged in an aluminum tray, then cooled to room temperature to give 195.8 grams (98% yield) product as an off white crystalline solid. $^1$H NMR indicated that the desired product was formed. Physical properties of this compound are shown in Table 1 below.

Example 3

Synthesis of Amorphous Amine D Monoamide Using Hexanoic Acid, R=$C_5H_{11}$

To a 3 neck 250 mL round bottomed flask equipped with a dean stark trap and condenser, thermocouple and argon inlet was added Amine D (42.27 grams, 145 mmoles, obtained from Eastman Corporation) and hexanoic acid (16.84 grams, 145 mmoles, available from Sigma Aldrich). The mixture was slowly heated under argon to about 160° C. during which reagents melted/dissolved. The temperature was raised to about 180° C. The reaction mixture was stirred at 180° C. overnight (~20 hours) during which about 2.6 ml of water was collected in the dean stark trap. A vacuum (1-2 mm-Hg) was applied for ~10 minutes. The resulting product was cooled under argon to ~140° C. and discharged in an aluminum tray, cooled to room temperature to give 53.8 grams (95% yield) product as tacky light brown solid. $^1$H NMR indicated that the desired product was formed. Physical properties of this compound are shown in Table 1.

TABLE 1

Summary of material properties

| Ex. | Component | Amine | Acid | Acid Value (mg KOH/g) | Tm/Tcrys (° C.) | Tg (° C.) | Viscosity @ 140° C. (cps) | % BRC (biorenewable content) |
|---|---|---|---|---|---|---|---|---|
| 1 | Crystalline | phenylethyl | benzoic | 11.8 | 117/90 | — | 3.39 | 0 |
| 2 | Crystalline | stearyl | benzoic | 2.8 | 90/77 | — | 4.13 | 68 |
| 3 | Amorphous | Amine D | hexanoic | 4.1 | — | 10 | 41.8 | 71 |

Examples 4A and 4B

Ink Formulations

Two all-amide crystalline-amorphous ink compositions were prepared using N-Phenylethylbenzamide and N-stearylbenzamide as the crystalline materials and Amine D-hexanoic acid mono-amide as the amorphous material:

Example 4A: Ink Formulation using N-phenylethylbenzamide

| Component | wt % | m (g) |
|---|---|---|
| N-phenylethylbenzamide (crystalline) | 66.7 | 6.67 |
| Amine D-monoamide (amorphous) | 20.0 | 2.00 |
| Pigment concentrate* | 13.33 | 1.33 |
| TOTAL | 100.00 | 10.00 |

Example 4B: Ink Formulation using N-stearybenzamide

| Component | wt % | m (g) |
|---|---|---|
| N-stearybenzamide (crystalline) | 66.7 | 6.67 |
| Amine D-monoamide (amorphous) | 20.0 | 2.00 |
| Pigment concentrate* | 13.33 | 1.33 |
| TOTAL | 100.00 | 10.00 |

*Pigment concentrate was made from 67% distearyl terepthalate (80% BRC), PEI dispersant and SunFlo SFD-B124 synergist

Ink Properties

Figure 1:
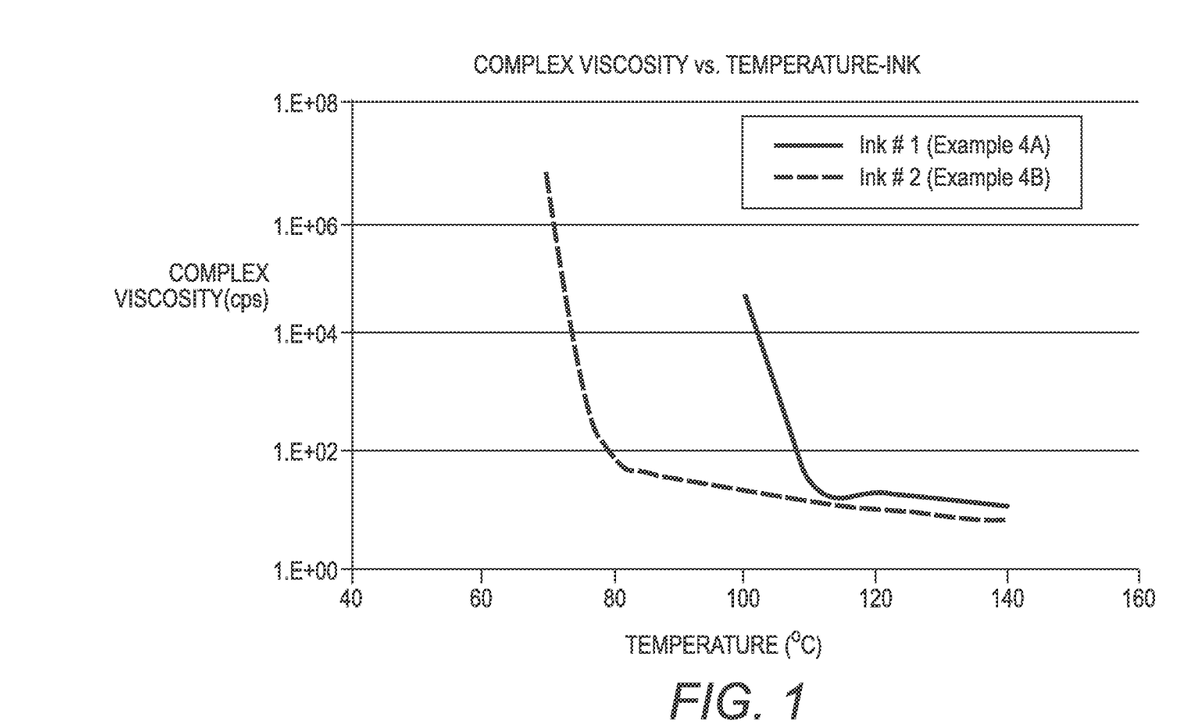
FIG. 1 shows rheology profiles for inks using amide compounds as both crystalline and amorphous components, according to embodiments of the present disclosure.

Ink rheology was measured for both inks. One example is shown in FIG. 1. Table 2 shows that tested ink formulations have the appropriate viscosity at 140° C. for jetting (about 10 cps) and undergo the requisite phase change. In the case of the ink of Example 4B, addition of rheology modifiers is possible to reduce the viscosity to about 10 cps if required. Also captured is the BRC (biorenewable content of the ink ranging from 21 to 66%).

TABLE 2

Viscosity Measurements of Ink Formulations 1 and 2

| Ink Example # | Viscosity @ 140° C. (cps) | % BRC |
|---|---|---|
| 4A | 11.39 | 21 |
| 4B | 6.36 | 66 |

Robustness Tests

To test robustness of prints, both inks of Examples 4A and 4B were K-proofed on coated paper (DCEG: Xerox® Colour Elite Gloss, 120 gsm). The K-proof sample was duplicated for scratch, fold, and fold offset examination. K-proof samples of wax based conventional solid inks and Oce cyan were prepared in the same manner as the control samples. Then, the K-proofs were spread by feeding each print through a Typhoon fixture at 1 inch/second at a drum and paper temperature of 50° C. with the ink surface facing the transfix drum.

One K-proof of each ink was then scratched using the XRCC three-finger gouge system, and another K-proof folded along with a Xerox® Business 4200 (75 gsm) facing page in a Formax folder at 100% speed and evaluated for fold crease and fold offset. Evaluation was done by using SIR and comparing with other inks.

Figure 2:
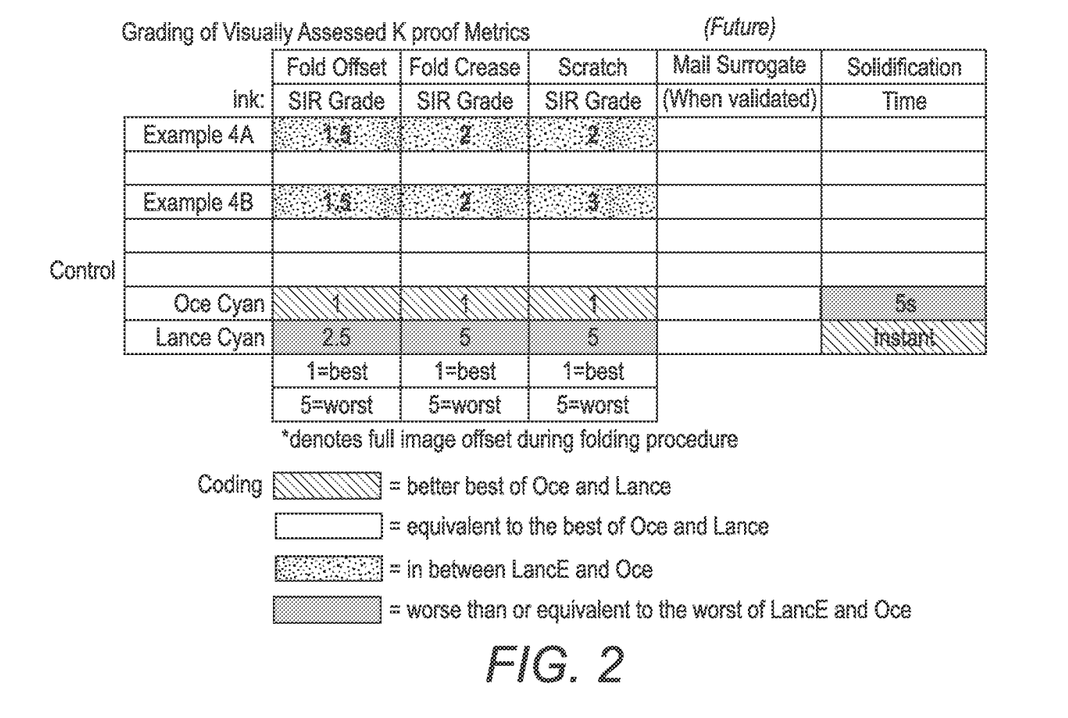
FIG. 2 shows example K-proof data for inks, according to embodiments of the present disclosure.

FIG. 2 shows robustness evaluation results of Example 4A and Example 4B, which showed superior robustness compared to wax based conventional solid inks and current Chandra inks in terms of scratch, fold crease, and fold offset (rank order of 2 for the amorphous amide-containing ink vs. 3 for the Chandra 3P ink control that uses an amorphous TBCT ester). Inks of Example 4A and Example 4B also showed improvement in their SIR robustness ratings over wax based conventional solid inks.

Ink Crystallization Rate (TROM, or Time-Resolved Optical Microscopy)

The inks were tested for rates of crystallization, a measure of speed of solidification. The rate of crystallization was measured by the TROM procedure, described below. The sample was quenched from the melting temperature to 40° C. and the crystallization process was followed by Polarized Optical Microscopy. Table 3 summarizes the TROM results for selected inks and components.

The total time of crystallization ranged from about 5 to about 9 seconds by standard TROM protocol, as described below. TROM monitors the appearance and the growth of crystals by using Polarized Optical Microscopy (POM). The sample is placed between crossed polarizers of the microscope. Crystalline materials are visible because they are birefringent. Amorphous materials or liquids, similar to, for example, inks in their molten state that do not transmit light, appear black under POM. Thus, POM enables an image contrast when viewing crystalline components and allows for pursuing crystallization kinetics of crystalline-amorphous inks when cooled from the molten state to a set-temperature. Polarized optical microscopy (POM) enables exceptional image contrast when viewing crystalline components.

Crystal formation and growth is recorded with a camera. When viewed under POM, when the ink sample is molten at time zero, the crystalline-amorphous inks appear black as no light is passed through. As the sample crystallizes, the crystalline areas appear brighter. The numbers reported by TROM include: the time from the first crystal (crystallization onset) to the last (crystallization completion). The definition of key measured parameters of the TROM process are set forth below:

Time zero (T=0 s)—the molten sample is placed on the cooling stage under microscope.

T onset=the time when the first crystal appears.

T growth=the duration of the crystal growth from the first crystal (T onset) to the completion of the crystallization (T total).

T total=T onset+T growth.

In order to obtain data that allow comparison between different and various samples, standardized TROM experimental conditions were set, with the goal of including as many parameters relevant to the actual printing process. The key set parameters include:

(a) glass slides of a 16-25 mm diameter and a thickness ranging from 0.2 mm to 0.5 mm.

(b) ink sample thickness in a range from 5 to 25 microns (c) cooling temperature set at 40° C.

It should be understood that the crystallization times obtained with the TROM method for selected inks are not identical to what would be the crystallization times of a droplet of ink in an actual printing device. In an actual printing device such as a printer, the ink solidifies much faster. It was determined that there is a good correlation between the total crystallization time as measured by the TROM method and the solidification time of an ink in a printer. In the standardized conditions described above, it was determined that inks which solidify within 10-15 second or less measured by the TROM method, are suitably fast for printing, typically at speeds from 100 feet/minute or higher.

Correlation studies between TROM numbers and printing speed on a web fed print test apparatus showed that inks with a $T_{total}$ time of crystallization of about 4-5 seconds, as determined by TROM, and with a crystallization onset of about 2 seconds, were fast enough to print at the highest speed on the print test apparatus without blocking. As such, the ink of Example 4B was found suitable for production printing, where fast printing is a key requirement.

The ink of Example 4A showed a total time of crystallization of about 9 seconds and an onset of crystallization time of about 4 seconds. This slower crystallization rate may be considered unsuitable for some production environments. However, slightly slower inks like this one are ideally suited for office environment printing. Key benefits typically associated with slightly slower crystallizing inks include improved robustness, spreading and/or potentially higher gloss.

TABLE 3

Summary of TROM Crystallization Rate Results

| Sample ID | Material | Composition | $T_{test}$ (°C.) | $T_{crys\,onset}$ (s) | $T_{cryst\,elapsed}$ (s) | $T_{cryst\,total}$ (s) | Cryst rate |
|---|---|---|---|---|---|---|---|
| Example 1 | Crystalline | Cryst only (N-PhEt benzamide) | 140 | 1 | 2 | 3 | Fast |
| Example 4A | Ink | Cryst: N-PhEt benzamide Am: Amine D-hexanoic acid mono-amide + pigment | 140 | 4 | 5 | 9 | Slow |
| Example 4B | ink | Cryst: N-stearyl benzamide Am: Amine D-hexanoic acid mono-amide + pigment | 140 | 4 | 1 | 5 | Fast |
| Example 3 | Base | Cryst:Am, no pigment | 140 | 2 | 1 | 3 | Fast |
| Example 2 | Crystalline | Cryst only (N-stearyl benzamide) | 140 | 3 | 1 | 4 | Fast |

The above data indicated that the amides of the present disclosure have suitable physical properties for the crystalline and amorphous components of solid ink. The examples demonstrated improved robustness, with respect to scratch, fold, and fold offset compared to wax based conventional solid inks on the same media. Inks for both production printing and office printing applications can be formed.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A solid ink composition, comprising:
   a crystalline component comprising a mono-amide compound with an aromatic ring core;
   an amorphous amide component, the amorphous amide component being selected from the group consisting of polycyclic mono-amides, polycyclic diamides and mixtures thereof; and
   a colorant.

2. The composition of claim 1, wherein the mono-amide compound is a product of benzoic acid and a primary or secondary amine.

3. The composition of claim 1, wherein the mono-amide compound is a compound of formula 1:

where $R^1$, $R^2$, $R^a$, $R^b$, $R^c$, $R^d$, and $R^e$ are independently selected from the group consisting of a hydrogen atom, a $C_1$ to $C_{40}$ aliphatic substituent and a $C_1$ to $C_{40}$ aromatic substituent, wherein at least one of $R^1$ and $R^2$ is not a hydrogen atom.

4. The composition of claim 3, wherein $R^1$, $R^2$, $R^a$, $R^b$, $R^c$, $R^d$, and $R^e$ are independently selected from the group consisting of a hydrogen atom; linear, branched or cyclic $C_1$ to $C_{40}$ alkyl, alkenyl, aryl, alkaryl and arylalkyl groups; and any $C_1$ to $C_{40}$ alkyl, alkenyl, aryl, alkaryl and arylalkyl groups containing one or more hetero atoms.

5. The composition of claim 3, wherein $R^1$, $R^a$, $R^b$, $R^c$, $R^d$, and $R^e$ are hydrogen atoms and $R^2$ is selected from the group consisting of an alkylphenyl group and a $C_8$ to $C_{30}$ hydrocarbyl group.

6. The composition of claim 1, wherein the amorphous amide component comprises an abietyl moiety.

7. The composition of claim 1, wherein the amorphous amide component comprises a compound of formula 2 or formula 3:

(2)

(3)

where R' is selected from the group consisting of a hydrogen atom and —NHC=OR$^4$, and $R^3$ and $R^4$ are independently selected from the group consisting of $C_1$ to $C_{40}$ aliphatic and $C_1$ to $C_{40}$ aromatic substituents.

8. The composition of claim 7, wherein $R^3$ is a $C_1$ to $C_{12}$ alkyl.

9. The composition of claim 1, wherein the colorant is selected from the group consisting of a dye, a pigment and mixtures thereof.

10. The composition of claim 1, wherein the crystalline and amorphous amide components are blended in a weight ratio ranging from about 60:40 to about 95:5, respectively.

11. The composition of claim 1, wherein the composition comprises a bio-renewable content of at least 20% by weight.

12. The composition of claim 1, wherein the ink composition has a total time of crystallization ranging from about 4 second to about 10 seconds as measured by Time-Resolved Optical Microscopy.

13. A method comprising:
providing an ink jet printing device comprising a solid ink composition, the solid ink composition comprising: (a) a crystalline component comprising a mono-amide compound with an aromatic ring core, (b) an amorphous amide component, the amorphous amide component being selected from the group consisting of polycyclic mono-amides, polycyclic diamides and mixtures thereof, and (c) a colorant;
heating the solid ink composition to a temperature above the melting point of the composition to liquefy the ink composition; and
jetting the liquefied ink composition from the ink jet printing device onto a substrate to form an image.

14. The method of claim 13, wherein the mono-amide compound is a reaction product of benzoic acid and a primary or secondary amine.

15. The method of claim 13, wherein the mono-amide compound is a compound of formula 1:

(1)

where $R^1$, $R^2$, $R^a$, $R^b$, $R^c$, $R^d$, and $R^e$ are independently selected from the group consisting of a hydrogen atom, a $C_1$ to $C_{40}$ aliphatic substituent and a $C_1$ to $C_{40}$ aromatic substituent, wherein at least one of $R^1$ and $R^2$ is not a hydrogen atom.

16. The method of claim 13, wherein the amorphous amide component comprises a compound of formula 2:

(2)

where R' is selected from the group consisting of a hydrogen atom and —NHC=OR$^4$, and $R^3$ and $R^4$ are independently selected from the group consisting of $C_1$ to $C_{40}$ aliphatic and $C_1$ to $C_{40}$ aromatic substituents.

17. The method of claim 13, wherein the liquefied ink composition has a total time of crystallization ranging from about 4 second to about 10 seconds as measured by Time-Resolved Optical Microscopy.

18. A solid ink composition, comprising:
a crystalline component comprising a mono-amide compound with an aromatic ring core;
an amorphous amide component, the amorphous amide component being selected from the group consisting of polycyclic mono-amides, polycyclic diamides and mixtures thereof; and
a colorant,
wherein the crystalline component has a viscosity of less than 12 cps at a temperature of about 140° C.; the amorphous amide component has a viscosity greater than that of the crystalline component and less than 100 cps at a temperature of about 140° C.; and both the crystalline component and the amorphous amide component have a viscosity of greater than $1\times10^{5.5}$ cps at about 25° C.

* * * * *